United States Patent [19]

Simonson et al.

[11] Patent Number: 4,951,182

[45] Date of Patent: Aug. 21, 1990

[54] MODULAR PLASTIC POWER-LIGHT PEDESTAL ENCLOSURE

[75] Inventors: Dale E. Simonson; Ronald J. Orchard, both of Mankato; Donald H. Stoll, No. Mankato, all of Minn.

[73] Assignee: General Electric Company, New York, N.Y.

[21] Appl. No.: 380,362

[22] Filed: Jul. 17, 1989

[51] Int. Cl.⁵ ................................................ F21S 1/02
[52] U.S. Cl. ..................................... 362/145; 362/431; 362/374; 361/334; 312/100; D13/133
[58] Field of Search ............... 362/253, 190, 191, 196, 362/362, 374, 85, 145, 152, 153, 375, 431, 200, 457, 458; 361/334; D13/133, 137, 139, 184; 312/100, 123; 52/27, 28; 222/113, 184, 192

[56] References Cited

U.S. PATENT DOCUMENTS

| | | | |
|---|---|---|---|
| 2,534,992 | 12/1950 | Reid | 362/374 |
| 3,225,224 | 12/1965 | Rydbeck | 361/334 |
| 3,341,268 | 9/1967 | Bickford | 312/100 |
| 4,345,304 | 8/1982 | Penney et al. | 362/191 |
| 4,438,484 | 3/1984 | Winden | 362/431 |
| 4,507,715 | 3/1985 | Wedding | 362/431 |
| 4,519,657 | 5/1985 | Jensen | 339/15 |
| 4,546,418 | 10/1985 | Baggio et al. | 362/85 |
| 4,713,734 | 12/1987 | Delcoy | 362/432 |
| 4,713,735 | 12/1987 | Hiltman | 362/183 |
| 4,785,376 | 11/1988 | Dively | 361/334 |
| 4,843,525 | 6/1989 | Williams | 362/183 |

*Primary Examiner*—Ira S. Lazarus
*Assistant Examiner*—D. M. Cox
*Attorney, Agent, or Firm*—Richard A. Menelly; Walter C. Bernkopf; Fred Jacob

[57] ABSTRACT

A modular marina power pedestal and light pedestal enclosure is fabricated from a pair of opposing flanged plastic sidepieces that are sized to accept both lamp enclosures as well as electrical power centers. A wide variety of customer options that include power receptacles, telephone connectors, metering facilities and water hook-up are available with slight modification. Existing lamp enclosures and power centers are received within the enclosure without modification.

13 Claims, 7 Drawing Sheets

MODULAR PLASTIC POWER-LIGHT PEDESTAL ENCLOSURE

BACKGROUND OF THE INVENTION

An electrical power center for marinas can basically be described as a power receptacle contained within an enclosure which is attached to an upstanding post. The same power center is referred to as a "power pedestal" wherein the power receptacle enclosure is self-supporting. The power pedestal usually includes a light, electric meters, power receptacles, telephone and television connectors and a water faucet.

The combination of a light source mounted on top of a power center is described in U.S. Pat. No. 3,341,268. When the power center is opened to make the electrical connection, the cover to the power center blocks the light from the interior making the power connection difficult in the absence of ambient illumination.

A simplified light pedestal consisting of a light source enclosure on a free-standing support is usually employed to provide marina illumination in those areas that are remote from the boat anchorage site.

U.S. Pat. No. 4,546,418 describes a lighted power pedestal in which the cover is provided with a sloping lens to downwardly direct the light and thereby-provide "stumble" lighting to the dock area in the immediate area.

U.S. design patent application Ser. No. 235,578 filed Aug. 24, 1988, describes a prismatic lens arrangement for distributing the light over a wide area rather than directing the light in a downward direction.

A free-standing lighted power pedestal is described within U.S. Pat. No. 4,519,657 wherein a plurality of plastic components are assembled to provide a power pedestal enclosure that includes electric metering, telephone and television cable hook-ups, a water faucet along with the standard electric power receptacles.

Although such completely plastic power pedestals have been commercially available for some time, the high cost involved with molding the large sized plastic enclosure components has prevented such self-contained plastic pedestals from being commercially successful. This is especially true, when a wide variation of options are desired for different marina applications. The difficulty in fabricating a corresponding variety of plastic power pedestal enclosures has further hindered the commercial success of existing plastic power pedestal designs.

One purpose of the instant invention is to provide an economical plastic power pedestal design having modular facility whereby several optional design features can be achieved by either factory or on-site assembly.

SUMMARY OF THE INVENTION

The invention comprises a molded plastic power pedestal sidepiece that accepts both existing light source enclosures as well as existing power center enclosures without modification. A pair of such identical sidepieces are joined together to form the power-light pedestal enclosure. The top part of the sidepieces is arranged for receiving the light source enclosure or power center enclosure without modification.

DESCRIPTION OF THE PREFERRED EMBODIMENT

Figure 1:
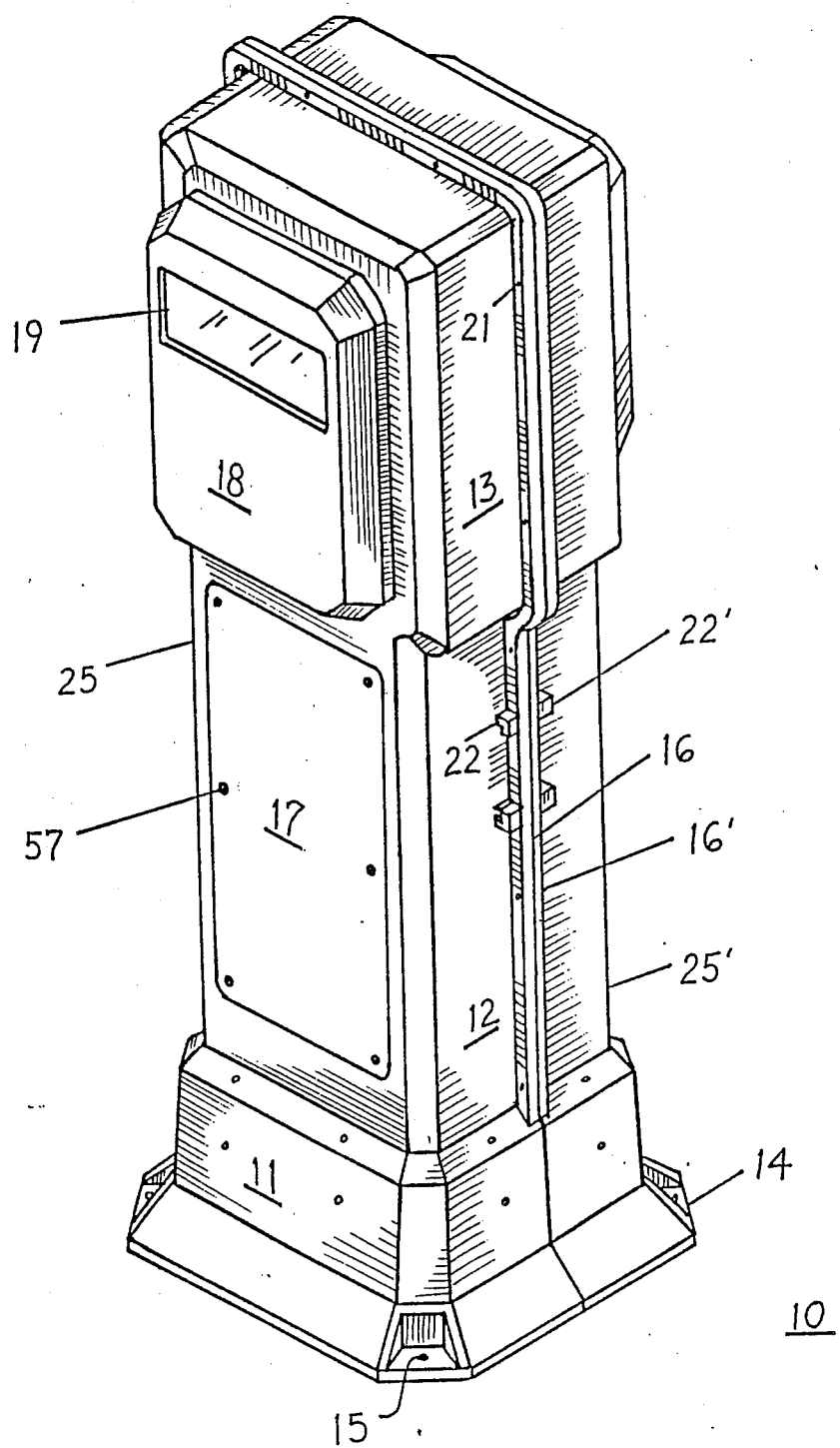
FIG. 1 is a top perspective view of the plastic power-light pedestal enclosure in accordance with the invention containing a standard lamp enclosure.

A plastic marina light pedestal 10 is depicted in FIG. 1 and consists of a plastic support base 11 which is fastened to a marina dock by means of thru-holes 15 formed within recesses 14 at each corner of the support base. The enclosure 12 extends upwards from the support base and terminates in a top 13 which supports a lamp enclosure 18 through which the light transmits by means of a plastic lens 19. The two sidepieces 25, 25' of the enclosure are fastened together by means of screws or rivets 21 through a pair of perimetric flanges 16, 16' that encompass the enclosure 12 and the top 13. A removable plastic panel 17 is fastened to the side of the enclosure by means of screws 57 to protect the internal wiring contained therein and a pair of angulated brackets 22, 22' are formed on both sides of the enclosure to support the Z-shaped hose hanger 23 best seen by referring now to FIG. 2.

Figure 2:
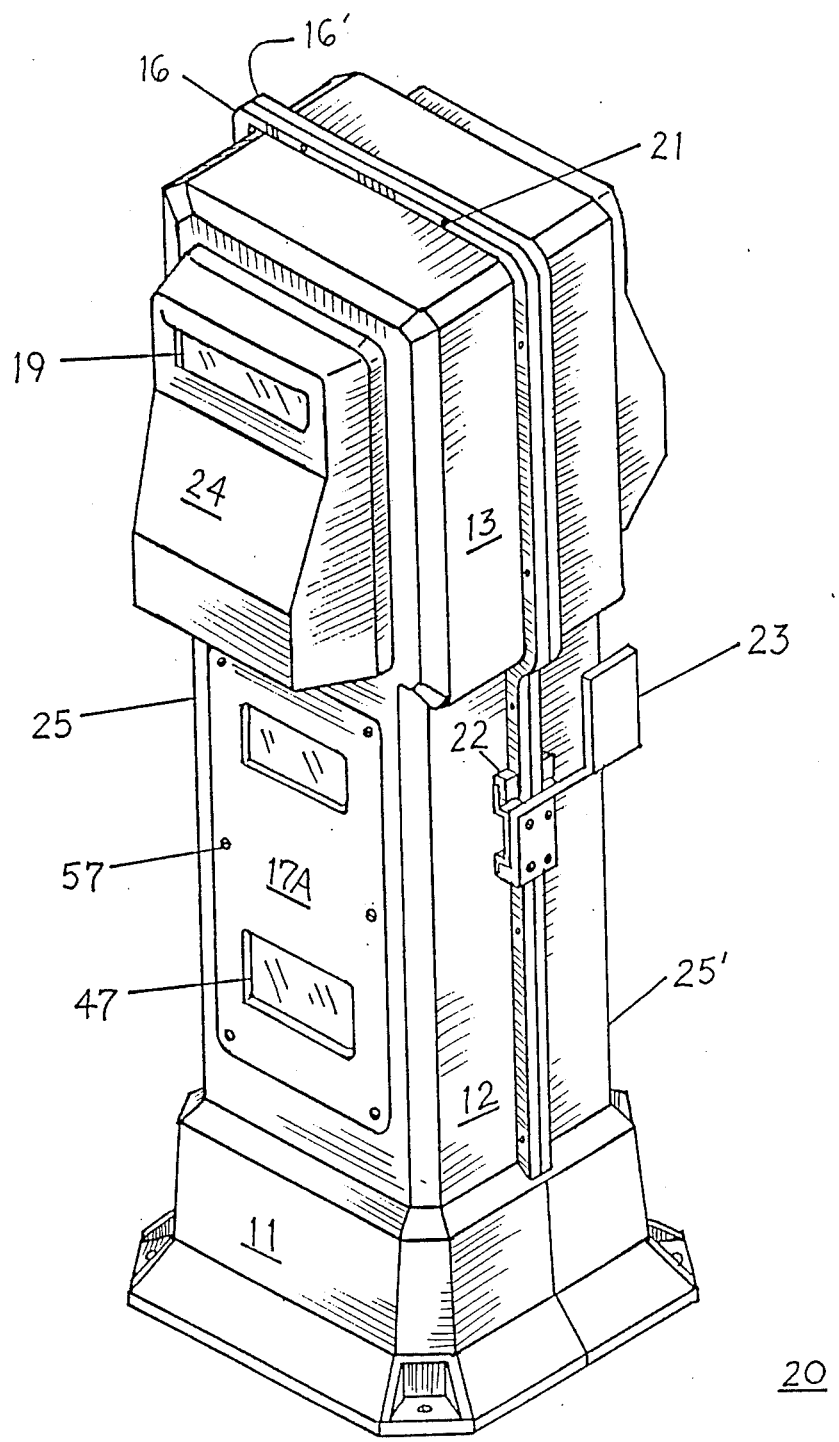
FIG. 2 is a top perspective view of the power-light pedestal enclosure of FIG. 1 containing a standard power center.

A plastic marina power pedestal 20 is depicted in FIG. 2 and contains similar components to those described earlier with reference to FIG. 1 such that like reference numerals will be employed. The enclosure 12 consists of two similar sidepieces 25, 25' that are fastened together by means of perimetric flanges 16, 16' and screws 21 on a support base 11 in the manner described earlier for the marina light pedestal 10 of FIG. 1. In place of the lamp enclosure 18 of FIG. 1, a power center 24 is positioned within the top 13 of the marina power pedestal 20 of FIG. 2. A similar lens 19 allows for the transmission of light out from within the power center. An apertured plastic panel 17A is fastened to the body member by means of screws 57 and includes transparent windows 47 for viewing electric meters which, although not shown, are contained within the marina power pedestal. As described earlier, the Z-shaped hose hanger 23 which is supported to the enclosure by means of angulated support brackets 22 supports a water hose (not shown).

Figure 3:
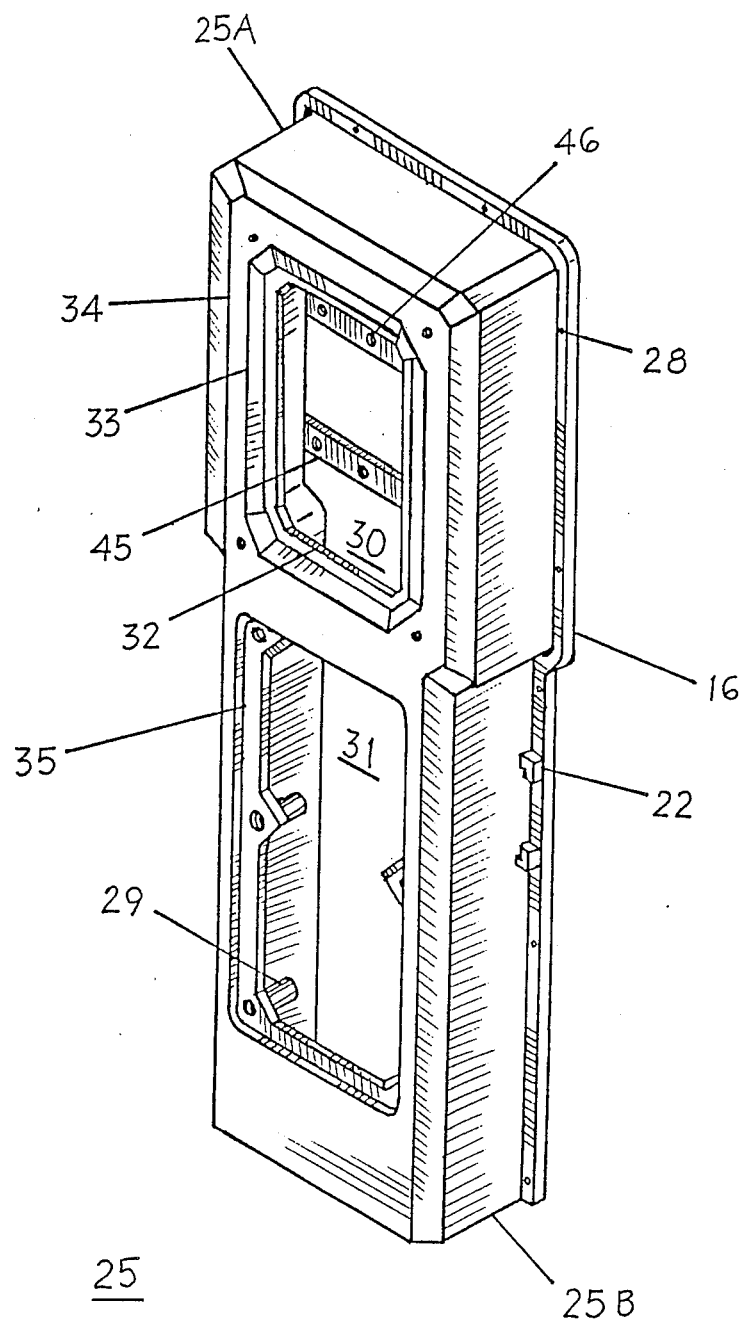
FIG. 3 is a front prospective view of a side section that forms a part of the power-light pedestal enclosure of FIGS. 1 and 2.

The modular properties of the enclosure 12 used with the marina light pedestal 10 of FIG. 1 and marina power pedestal 20 of FIG. 2 is best seen by referring now to FIG. 3 wherein a single molded sidepiece 25 is shown. The top part 25A includes a top opening 30 within which the lamp enclosure or power center is attached by means of transverse brackets 45 and threaded apertures 46. To provide a water-tight seal between the lamp enclosure or power pedestal and sidepiece 25, a recessed perimetric platform 32 is integrally-formed around the top aperture and a sloping inner wall 33 joins the planar outer perimeter 34 to the recessed platform. Prior to inserting the lamp enclosure or power center, an elastomeric gasket 58 (FIG. 6) is first seated on the recessed platform and the lamp enclosure or power center is next inserted within the top aperture through the gasket in a press-fit relation. An elongated bottom aperture 31 is formed within the bottom part 25B of the sidepiece and similarly includes a recessed perimetric platform 35 from which a plurality of internally-threaded radial bosses 29 extend. The threaded bosses are used for attaching the panels 17, 17A shown earlier in FIGS. 1 and 2. The perimetric outer flange 16 is provided with corresponding thru-holes 28 to allow two such sidepieces 25, 25' (FIG. 6) to be fastened together to form the enclosure 12. The angulated bracket supports 22 are integrally-formed along side the perimetric outer flange 16.

Figure 4:
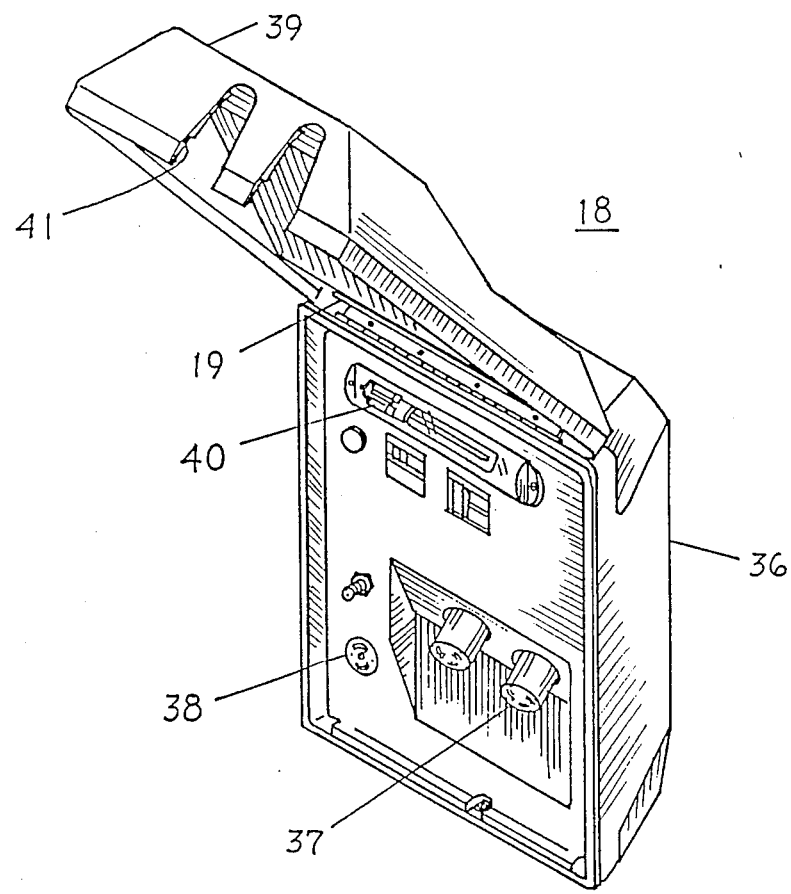
FIG. 4 is a top perspective view of a standard power center used within the power-light pedestal enclosure of FIG. 2.
Figure 5:
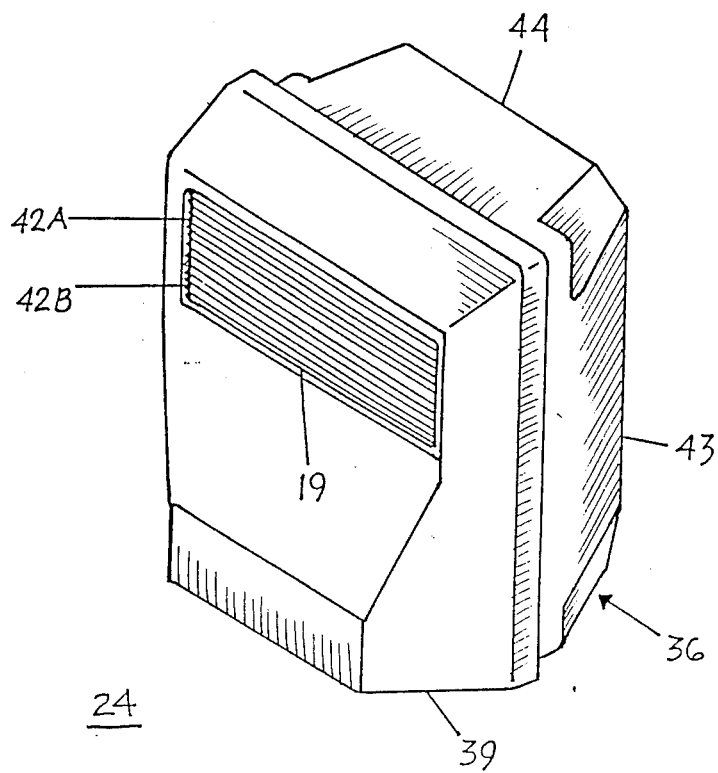
FIG. 5 is a top perspective view of the power center depicted in FIG. 4.

The marina power center 24 within the marina power pedestal 20 of FIG. 2 is depicted in FIGS. 4 and 5 and consists of a plastic case 36 to which a cover 39 is hingeably attached. A lamp 40 is positioned under the cover and a pair of power receptacles 37 along with a telephone connector 38 are positioned under the lamp. A pair of apertures 41 allow the cover to be closed when marine power cables are connected with the power receptacles. The light generated by the lamp exits from the cover through a lens 19 which includes a plurality of upwardly-facing prisms 42A and corresponding downwardly-facing prisms 42B formed therein. The prisms provide a wide distribution of light through the lens 19 for illumination of a large area. The case 36 includes a pair of opposing sidewalls, only one of which 43 is visible in FIG. 5, which taper inwardly toward each other away from the hingeable cover 39. The case further includes a pair of opposing top and bottom walls, although only the top wall 44 is visible. The top wall slopes downwardly toward the bottom wall away from the hingeable cover 39 while the bottom wall similarly slopes upwardly toward the top wall. The angle of slope of the top and bottom walls and the sidewalls corresponds to the angle of slope of the inner wall 33 within the top part 25A of the sidepiece 25 shown in FIG. 3. This sloping relationship allows the marina power center as well as the lamp enclosure to be received in a press-fit relation within the top aperture 30 of the sidepiece.

Figure 6:
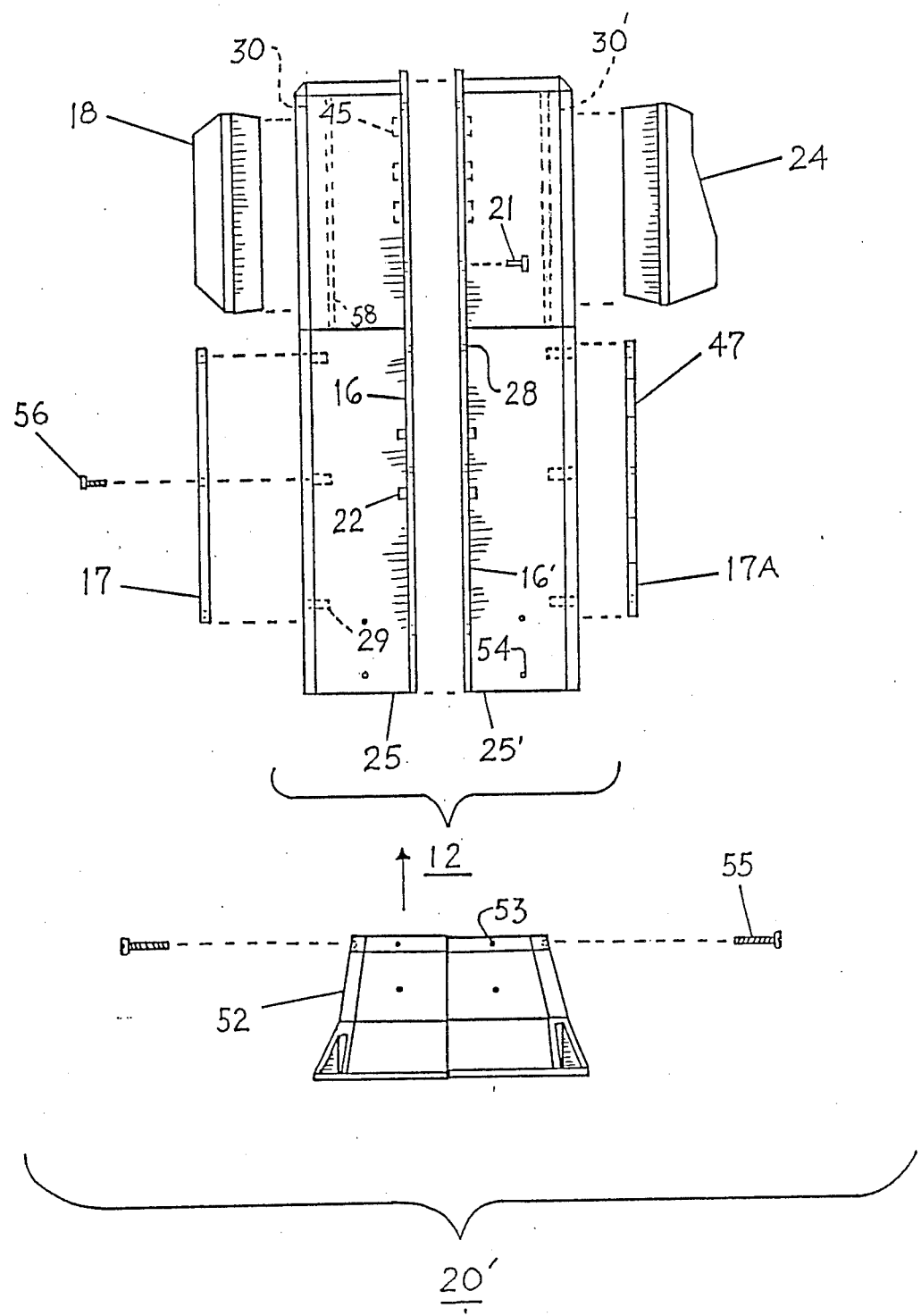
FIG. 6 is a side view of the power-light pedestal enclosure of FIGS. 1 and 2 with the components in isometric projection.

The modular properties of the enclosure 12 used with the marina light pedestal 10 of FIG. 1 and the marina power pedestal 20 of FIG. 2 is best seen by referring now to FIG. 6 wherein a marina power-light pedestal enclosure 12 is shown prior to assembly to form either a light pedestal, power pedestal or the combined light power pedestal 20'. A pair of opposing sidepieces 25, 25' are arranged for being fastened together by means of their respective perimetric flanges 16, 16' and screws 21. A complimentary one piece support base piece 52 is positioned for attaching to the sidepieces 25, 25' by means of screws 55, thru-holes 53 arranged through the base pieces and metal straps with threaded openings 54 formed integrally within the sidepieces. The plastic panel 17 is attached to the sidepieces by means of screws 56 and the internally-threaded bosses 29 integrally-formed within the sidepieces. The panel 17A having windows 47 can also be attached to the sidepieces, if electric meters, for example, are to be mounted within the enclosure. A lamp enclosure 18 is mounted within the top recess 30 and attached to the top of the enclosure by means of the brackets 45. A marina power center 24 is mounted within the top recess 30' and attached by means of similar brackets. In some instances, it is desirable to mount a power center 24 on both sides of the enclosure to form the marina power pedestal 20 shown earlier in FIG. 2 and in other instances it is desirable to mount two lamp enclosures 18, one on either side of the enclosure to form the marina light pedestal 10 depicted earlier in FIG. 1. For convenience as well as cost savings, however, it is often desirable to mount the lamp enclosure 18 on one side and the power center 24 on an opposite side to form the combined marina power-light pedestal 20' as shown. The combined marina power-light pedestal is mounted in such a manner that the power center faces the water to illuminate and provide ready access to the power receptacles from the boats while the lamp enclosure faces the landing to provide wide dock area lighting for general illumination purposes.

Figure 7A:
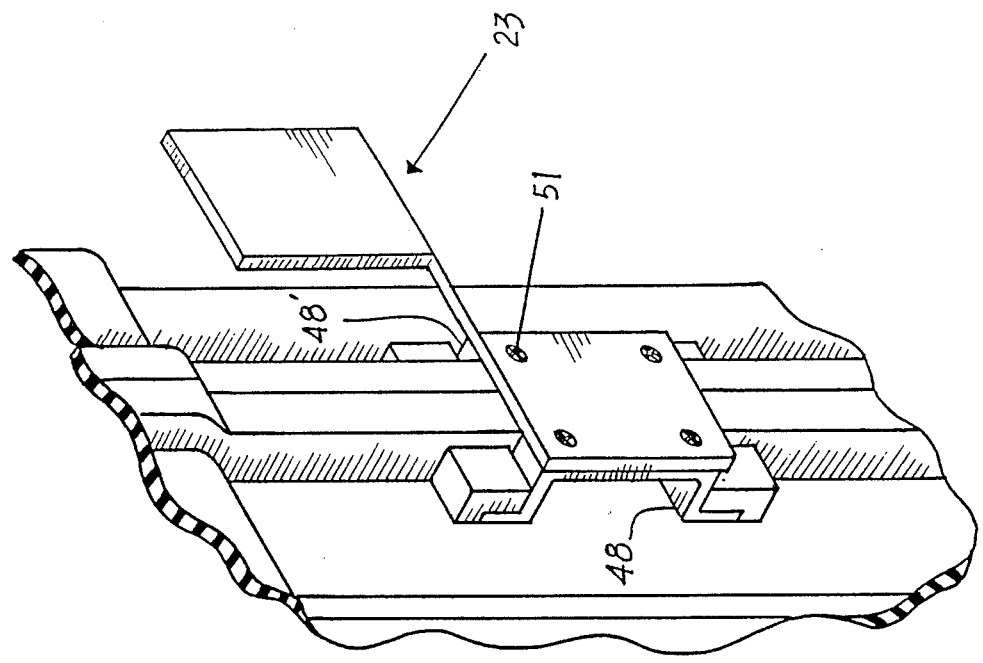
FIG. 7A is a front perspective view of a part of the power-light pedestal enclosure depicted in FIG. 2.
Figure 7B:
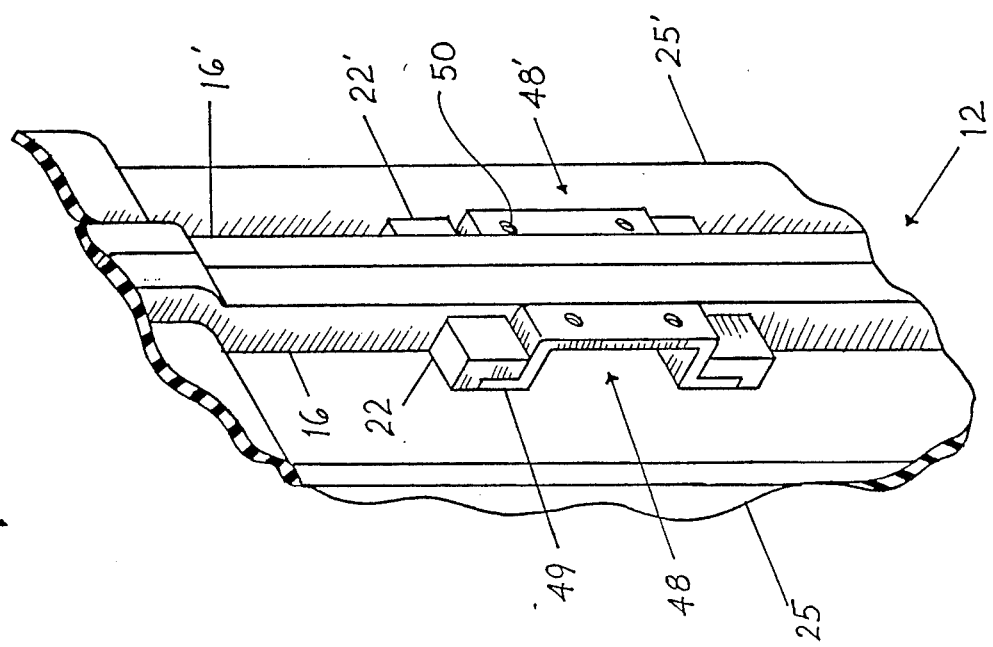
FIG. 7B is a front perspective view of the part of the power-light pedestal enclosure of FIG. 7A with a hose hanger attached.

The Z-shaped hose hanger 23 shown on the marina power pedestal 20 of FIG. 2 is attached to the marina power pedestal in the manner best seen by referring now to FIGS. 7A and 7B. The enclosure 12 having the two sidepieces 25, 25' attached together by means of their corresponding perimetric flanges 16, 16' automatically aligns the angulated bracket supports 22, 22' on both sidepieces. The tanged ends 49 of the pair of angulated brackets 48, 48' are captured beneath the bracket supports such that a pair of threaded openings 50 on the angulated brackets extend parallel along the perimetric flanges. The Z-shaped hose hanger 23 is next attached to the threaded openings on the angulated brackets 48, 48' by means of screws 51.

Figure 8:
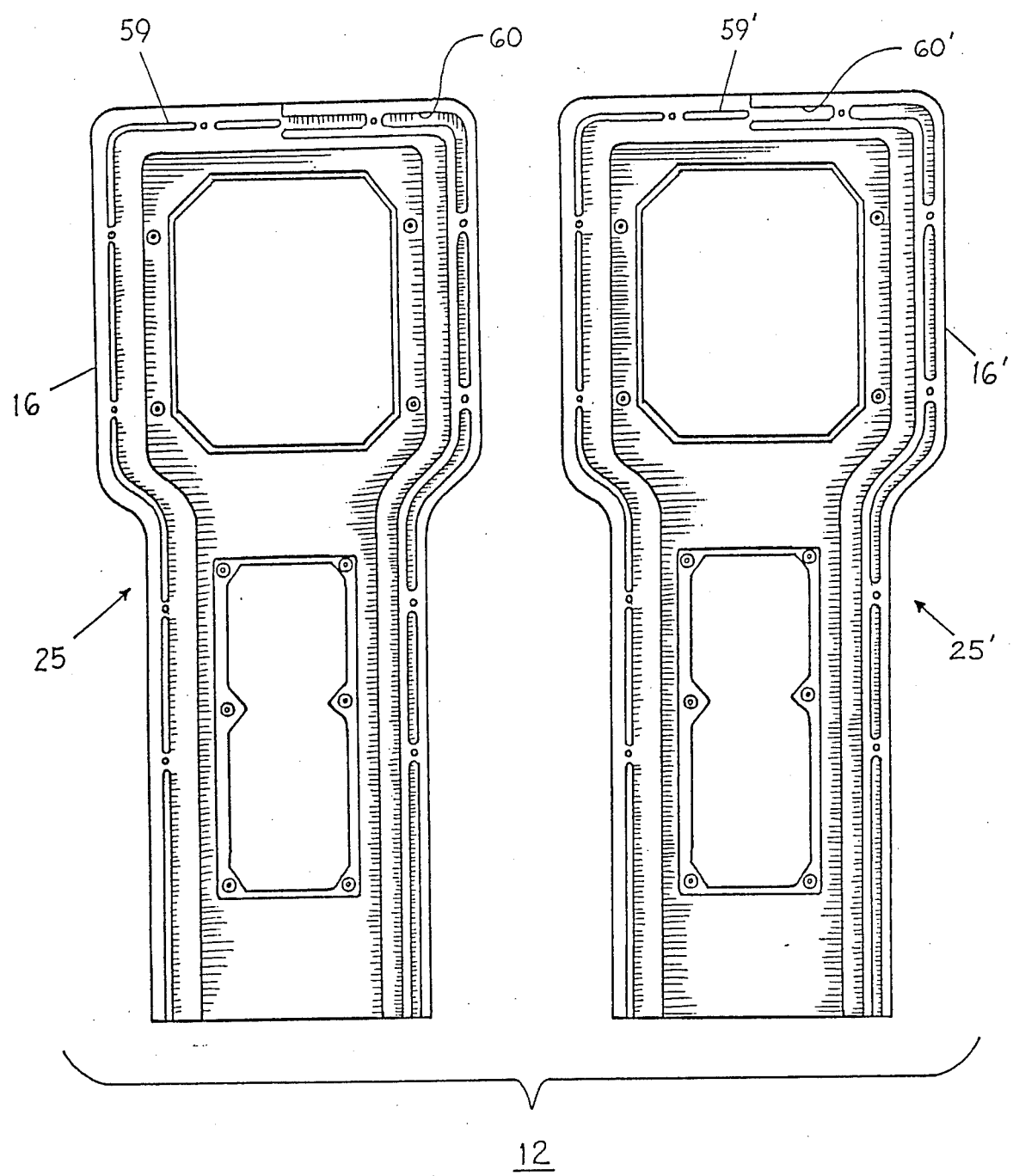
FIG. 8 is a front perspective view of the side sections of the enclosure of FIGS. 1 and 2 prior to assembly.

As shown in FIG. 8, the perimetric flanges 16, 16' of the two sidepieces 25, 25' are formed in a tongue and groove configuration wherein ribs 59, 59' are integrally-formed along one-half of each perimetric flange and complimentary grooves 60, 60' are formed along the other half to achieve a tight interlock between the two sidepieces when joined together to form the completed enclosure 12 as depicted in FIGS. 1 and 2.

A modular marina light-power pedestal arrangement has herein been described whereby a combination of light sources and power centers can be arranged on a pair of inexpensive plastic sidepieces. The light and power pedestal arrangements can be either factory assembled or assembled, in situ.

Having thus described our invention, what we claim as new and desire to secure by Letters Patent is:

1. A modular marina light-power pedestal assembly comprising:
   a pair of opposing unitary plastic sidepieces, each of said sidepieces having a perimetric flange integrally-formed therein, each of said sidepieces define a first and second rectangular opening defined therein;
   a base piece attached to said sidepieces, said base piece having means integrally-formed therein for attachment to a dock;

an electric power center within said first rectangular opening at one end of said sidepieces opposite said base piece wherein said perimetric flange includes apertures and wherein fastening means extend through said apertures to fasten said pair of sidepieces together; and wherein each of said sidepieces further include top and bottom apertures defining a top lamp enclosure space and a bottom meter receiving space respectively.

2. The assembly of claim 1 including bracket means extending across a rear of said top lamp enclosure space for attaching said power center to said sidepieces.

3. The assembly of claim 1 including a plurality of threaded bosses positioned inboard of said perimetric flanges and integrally-formed within said plastic sidepieces.

4. The assembly of claim 1 wherein said sidepieces each comprise a channel-shaped configuration open at a bottom and closed at a top.

5. The assembly of claim 1 including angulated bracket supports integrally-formed within each of said sidepieces.

6. The assembly of claim 5 including Z-shaped hose hangers fastened to said bracket supports.

7. The assembly of claim 1 including a plastic panel attached to one of said sidepieces over said bottom aperture.

8. The assembly of claim 7 wherein said panel includes window means providing visual access to meters mounted within said sidepieces.

9. The assembly of claim 1 including a lamp enclosure within said second rectangular opening.

10. The assembly of claim 1 wherein said first rectangular opening includes a pliable gasket, said electric power center extending through said gasket within first rectangular opening in press-fit relation.

11. The assembly of claim 1 wherein said second rectangular opening includes a pliable gasket, said lamp enclosure extending through said gasket within said second rectangular opening in press-fit relation.

12. The assembly of claim 1 wherein said perimetric flange defines an integrally-formed tongue and groove configuration.

13. The assembly of claim 12 wherein said tongue and groove configuration comprises a rib extending partially along said perimetric flange with a groove extending partially along said perimetric flange.

* * * * *